United States Patent [19]
Hochstein

[11] Patent Number: 5,173,653
[45] Date of Patent: Dec. 22, 1992

[54] BATTERY SAVER

[76] Inventor: Peter A. Hochstein, 2966 River Valley Dr., Troy, Mich. 48098

[21] Appl. No.: 584,455

[22] Filed: Sep. 18, 1990

Related U.S. Application Data

[63] Continuation-in-part of Ser. No. 268,584, Nov. 8, 1988, abandoned.

[51] Int. Cl.$^5$ .......................... H02J 7/00; H01H 7/00; H01H 43/00
[52] U.S. Cl. ...................................... 320/13; 307/141; 320/2
[58] Field of Search ....................... 320/13, 2; 307/141

[56] References Cited

U.S. PATENT DOCUMENTS

| | | | |
|---|---|---|---|
| 4,347,444 | 8/1982 | Taylor et al. | 307/141 |
| 4,588,901 | 5/1986 | MacLay et al. | 307/141 |
| 4,591,781 | 5/1986 | Larson | 307/141 X |

Primary Examiner—R. J. Hickey
Attorney, Agent, or Firm—Reising, Ethington, Barnard, Perry & Milton

[57] ABSTRACT

The invention is a timer assembly (10, 100) to be interposed between a battery (12) and an electrical load (14) having a device switch (16). A timing cycle is initiated upon detection of closure of the device switch (16). The timer (10, 100) will terminate the current flow after the timing cycle. The timer assembly (10, 100) includes a first embodiment (10) to be connected in parallel with the battery (12) and electrical device (14), and a second embodiment (10, 100) connected in series with the battery (12) and the electrical load. Upon closure of the device switch (16), a detector (42, 44, 46) produces a pulse initiating the timing cycle. The timing cycle may be realized by discharging a storage capacitor (38, 40) or by a timer chip (36) controlling an electronic switch (26, 28, 30, 32) within the timer assembly (10, 100) to connect and disconnect the battery (12) to the load (14).

31 Claims, 3 Drawing Sheets

BATTERY SAVER

This is a continuation-in-part of copending application Ser. No. 0/268,584 filed on Nov. 8, 1988, now abandoned.

TECHNICAL FIELD

This invention relates to an automatic turn off circuit for disconnecting an electrical device from a battery power supply after a predetermined time.

BACKGROUND OF THE INVENTION

Battery powered entertainment and portable test equipment has become increasingly popular. The convenience of this portability is, however, partly offset by the need to continuously charge or recharge batteries. Proper circuit design can yield acceptable battery life for most portable appliances. It is primarily the accidental or inadvertent act of leaving the instrument on for unintentionally long periods of a time that is the bane of battery operated equipment. The relatively high cost of today's sophisticated batteries produces a need for conservation circuits which can prevent inadvertent battery drain. Some entertainment devices such as television sets, stereo systems, and radios incorporate a "sleep" switch which will turn off the instrument after a predetermined period of time. Sleep timers or battery saver circuits have not been generally available for retrofitting into existing electronic products. The greatest benefit in the use of such devices would occur with traditional miniaturized consumer products such as tape players, radios, radio receivers and related goods. Adding battery saving circuitry to such existing products is not only difficult because of size and packaging constraints, but is well beyond the technical expertise of most consumers. Existing technology uses either a switch to be momentarily depressed and released to start a timing process, or an additional switch on the circuitry to be actuated.

One such device uses a timing circuit wherein after a switch within the timing circuitry is closed, power will be supplied for only a predetermined time. Such an assembly is disclosed in U.S. Pat. No. 3,940,660 issued Feb. 24, 1976 in the name of Frederick H. Edwards. This patent discloses a timing circuit wherein after a switch is closed, power will be supplied for only a predetermined time. By moving the switch to its ON position, any charge on a timing capacitor will be discharged turning a second switch ON to supply power to the device which and will remain ON until the timing capacitor has charged to a magnitude greater than a preset magnitude. This type of assembly requires a switch within the timing circuitry additional to the electrical device's switch for operating the timing control. A problem with this type of assembly is that such an assembly would not easily be adapted to a preexisting electrical device whose consumer desires a timer turn off circuit. The patent requires an additional switch integral with the timing circuitry. Adaptation of the circuitry and additional switch to an existing electrical device is complex and difficult.

Another such device uses a switch which needs to be momentarily depressed to initiate a timing cycle. Such a device is disclosed in U.S. Pat. No. 3,965,743 issued Jun. 29, 1976 in the name of Robert Bruce Turner and assigned to American Medical Electronics Corportation. A problem with this type of device is that the switch needs to be momentarily depressed or, turned on and off. In the consumer setting where the subject invention is to be used, this type of device is not adequate since the timing cycle will not initiate if the switch is merely turned on.

U.S. Pat. No. 4,777,384, issued Oct. 11, 1988 to Altenhof discloses a timing device which is inserted between an energizing control switch and a load. An AC source voltage is applied to the energizer control switch and the load. The device operates in a plurality of modes, and more important are the modes identified by version 3. Upon energizing after a long duration of the switch deenergized, a timed mode is entered. The load initially energizes until expiration of the timer, then deenergizes. Upon energizing after a short duration deenergized, the continuous mode is entered. The load is energized for as long as the device is energized. The device does not utilize a battery power supply which applies DC power, interconnection of the control means between the battery and the energizing switch nor entrance in the timing mode independent of prior openings of the device or energizing switch.

U.S. Pat. No. 4,740,672, issued Apr. 26, 1988 to Takei discloses a cooking apparatus with a timer function. The cooking device includes a timer, computer and start key. The operator sets the timer, and when a user depresses the cooking start key the microcomputer commands the heating control to begin cooking. Cooking is stopped when the display content is "zero". The apparatus does not include a battery powered supply for supplying DC power wherein the control circuit interconnects same to the device, nor connection of the control circuitry between the battery and the device which contains the device switch, nor subsequent opening and reclosure of the device switch closes the electronic switch means to reinitiate the predetermined time.

SUMMARY OF THE INVENTION AND ADVANTAGES

The invention is a timer assembly which is to be placed between a power supply and an electrical device supplied power from the power supply and the electrical device having a device switch to be closed to connect the power supply to the electrical device and to be opened to disconnect the power supply from the electrical device and a method of doing the same. The timer assembly comprises control means for placement between the power supply and electrical device. The control means is placed between the power supply and the electrical device containing the device switch, and includes electronic switch means for connecting and disconnecting the power supply to the electrical device. Also included is timing means responsive to the closure of the device switch of the electrical device time independent of prior opening thereof for closing the electronic switch means until the device switch is opened disconnecting power from the control means and opening the electronic switch means independently of the device switch after a predetermined time after the closure of the device switch while the device switch remains closed at the expiration of the predetermined time and remains closed upon opening of the electronic switch means wherein subsequent opening and re-closure of the device switch closes said electronic switch means to reinitiate the predetermined time.

The advantages of this type of assembly is that the timer assembly may be placed between the power supply and the electrical device with no additional switches to be adapted thereto. Also, it is advantageous to be responsive merely to the switching on or closure of the device switch so that the timing means will always be in an operable state to disconnect the power from the device when the predetermined time has expired.

DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
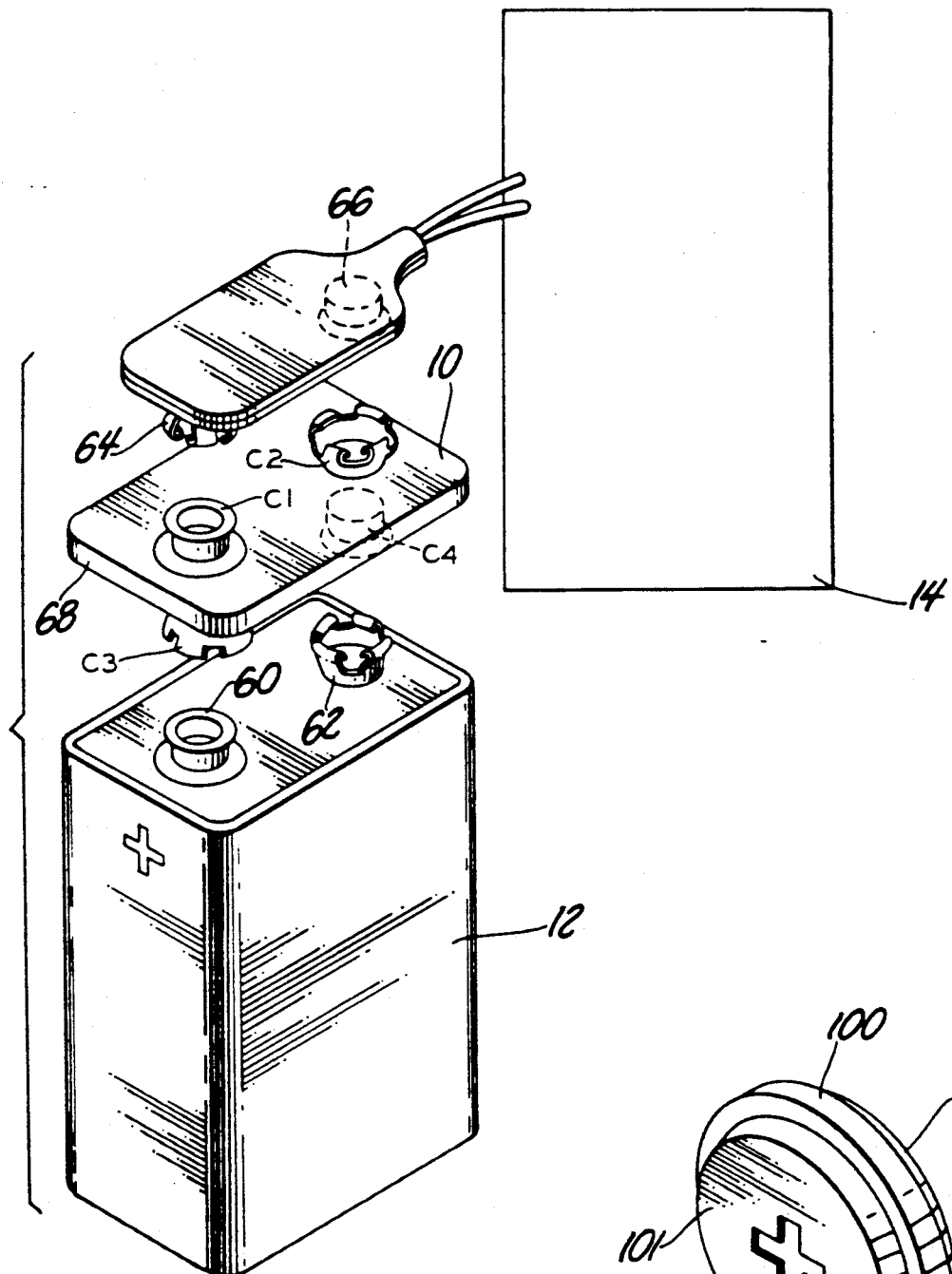
FIG. 1 is a perspective view of one embodiment of the subject invention.
Figure 2:
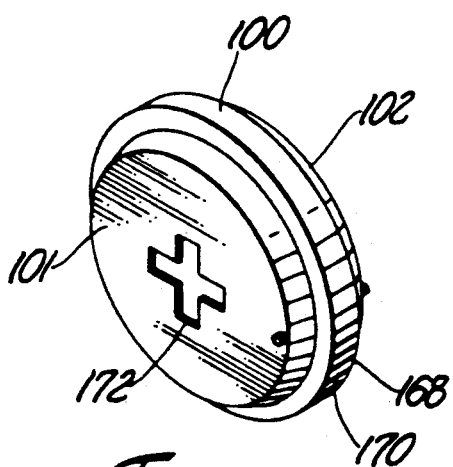
FIG. 2 is a perspective view of a second embodiment of the subject invention.

A timer assembly for disconnecting a power supply 12 from an electrical load 14 is generally shown at 10 in FIG. 1 and 100 in FIG. 2. The timer assembly 10, 100 uses the general operating principle that the timing cycle is initiated upon detection of a switch closure. The timer assembly 10, 100 is to be placed between a power supply 12 and an electrical device or load 14 supplied power from the power supply 12. The power supply 12 may be one or several batteries which supply d.c. power. The electrical device 14 must include a device switch 16 having ON and OFF positions to be closed to connect the power supply 12 to the electrical device 14 and to be opened to disconnect the power supply 12 from the electrical device 14 in general operation. The timer assembly 10, 100 is preferably used in battery powered devices supplying d.c. power which are generally portable. The timer assembly 10, 100 is to be interposed between the battery 12 and the existing circuitry of the electrical device 14 in order to terminate the current flow therebetween after a predetermined time period from closure or turning to the OFF position of the device switch 16. The timer assembly 10, 100 is an autonomous package to be used with any existing battery powered device 14. There are two embodiments of the timer assembly 10, 100: the first embodiment is connected in parallel with the battery 12 and electrical device 14, and the second embodiment is connected in series with the battery 12 and the electrical device 14.

Figure 3:
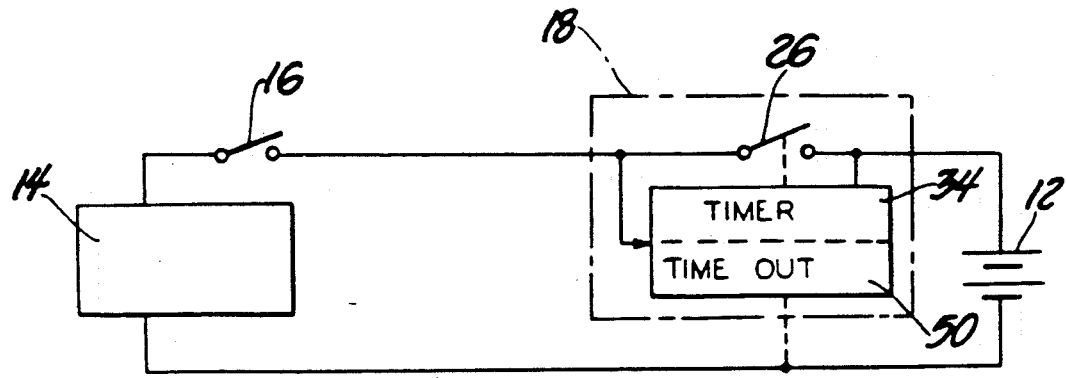
FIG. 3 is a block diagram of the subject invention.

In both embodiments and generally shown in FIG. 3, the timer assembly 10, 100 includes control means 18, 20, 22, 24 for placement between the power supply 12 and the electrical device 14. The control means 18, 20, 22, 24 includes electronic switch means 26, 28, 30, 32 for connecting and disconnecting the electrical device 14 to and from the power supply 12. Also included is timing means 34, 36, 38, 40 responsive to the closure of the device switch 16 of the electrical device 14 for closing the electronic switch means 26, 28, 30, 32 in response to the closure of the device switch 16 time independent of prior opening thereof, and opening the electronic switch means 26, 28, 30, 32 after a predetermined time after the closure of the device switch 16. In other words, the predetermined time or timing cycle is initiated upon only detection of closure of the device switch 16. Power will be supplied to the electrical device 14 during the timing cycle as long as the device switch 16 is closed by being in the ON position, and power will be discontinued to the electrical device 14 upon expiration of the timing cycle or opening of the device switch 16 by actuating it to its OFF position. When the device switch 16 is re-actuated to its ON position, any time after the opening thereof, the timing cycle is reinitiated.

The control means 18, 20, 22, 24 also includes detection means 42, 44, 46 for detecting the closure of the device switch 16 to produce a turn on pulse to initiate the timing means 34, 36, 38, 40. Therefore, the detection means 42, 44, 46 produces a pulse when the device switch 16 is turned from the OFF position to the ON position. The pulse will start the timing cycle or predetermined time closing the electronic switch means 26 for the predetermined time.

The control means 18, 20, 22, 24 also includes time-out indicating means 50, generally shown in FIG. 3, for audibly indicating when the predetermined time is about to expire. The time-out indicating means 50 may be a circuit for sensing the expired time and opening and closing repeatedly the electronic switch means 26 for audibly indicating that the predetermined time is about to expire.

The control means 18, 20, 22, 24 includes an input directly connected to the battery 12 and an output directly connected to the electrical device 14, and more particularly the device switch 16. No additional manual switches are connected to the electrical device 14, nor connected between the battery 12 and load 14.

In the first embodiment 10, the control means 20, 22 includes contacting connectors C1, C2, C3, C4 electrically connecting the assembly in parallel with the power supply 12. The first embodiment is a three terminal device wherein the connection to both terminals of a battery 12 is possible. Devices using the common miniature 9 volt rectangular battery 12 with snap contacts are good candidates for this type of timer assembly 10. Electronics for such a device could be incorporated within an adapter that would snap between the battery 12 and the existing battery 12 clip. The timer assembly 10 must be connected to both terminals of the battery 12 for operating the timer assembly 10. There are two alternative circuit implementations of the control means 20, 22 which may be used in this three terminal timer assembly 10 and are shown in FIGS. 4 and 5.

Figure 4:
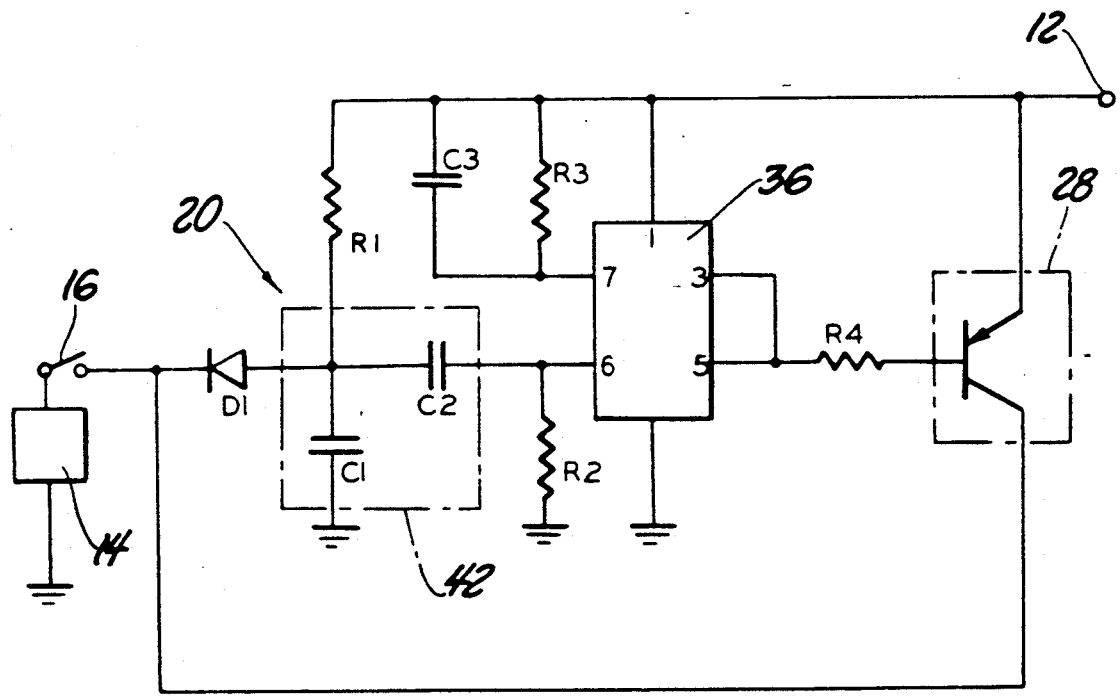
FIG. 4 is a schematic diagram of one alternative of the first embodiment of the subject invention.

The first alternate implementation of the first embodiment is shown in FIG. 4. The timing means 36 includes a timing integrated circuit chip 36 in the first alternate circuit implementation for controlling the electronic switch means 28 in response to closure of the device switch 16. The electronic switch means 28 uses a transistor Q1 connected between the battery 12 and load 14. In this embodiment, a standard micro-powered integrated circuit chip 36, drives the transistor 28 as a saturated PNP low side switch with a very low on state saturation voltage, typically under 60 mv at a 50 mA current drain. The timing cycle is initiated upon closure of the device switch 16. A capacitor C1 is normally charged to the battery 12 voltage through resistor R1 and the electrical device 14 or load, and is discharged through a diode D1 whenever the device switch 16 is closed and the transistor 28 is not conducting. A positive going turn-on pulse is produced upon closure of the device switch 16 and is coupled through capacitor C2 to the timing input trigger pin 6 of the integrated circuit chip 36. A resistor R2 discharges the capacitor C2 and keeps the input trigger pin 6 low in the absence of a turn-on pulse from the device switch 16 closure. The capacitor C3 and the resistor R3 are connected to power and pin 7 of chip 36, and establish the timing period for the integrated circuit chip 36, which with the specific values of the components used exceeds 20 minutes. The isolation diode D1 does not add to the timer assembly 10 voltage drop, but it merely prevents the transistor 28 output from feeding back to the trigger input pin 6. A resistor R4 is connected to pins 3 and 5 of the chip 36 and to the base of transistor 28.

Figure 5:
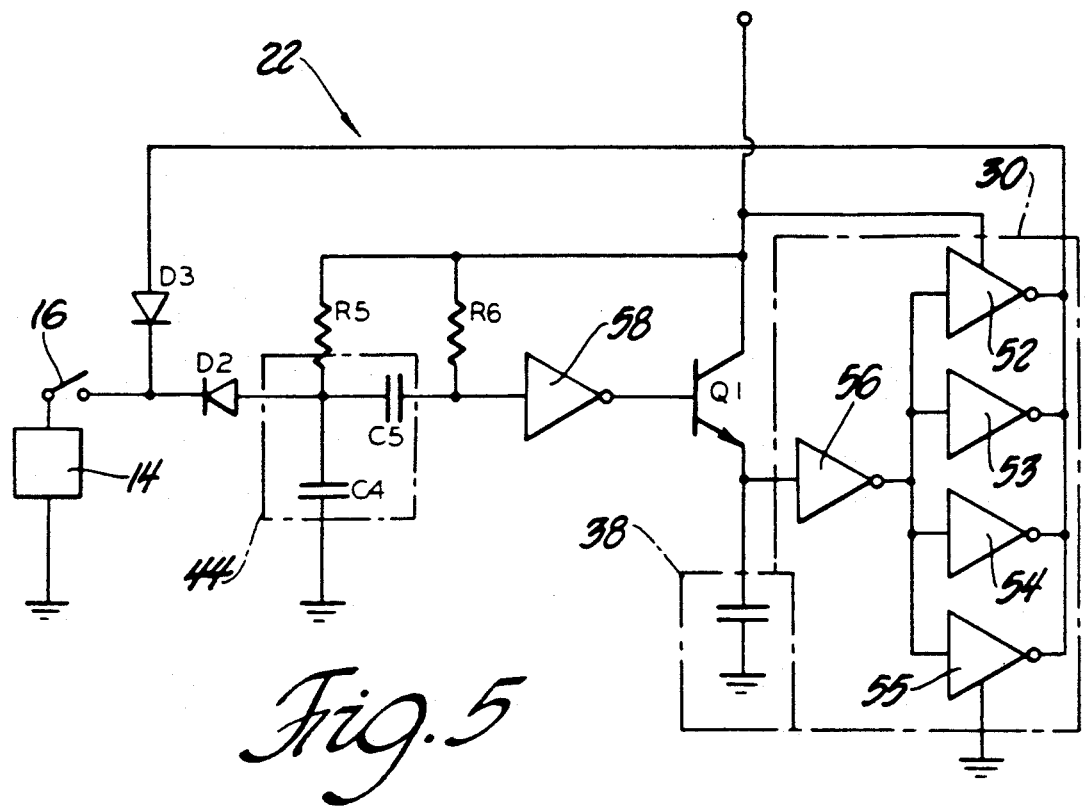
FIG. 5 is a schematic diagram of a second alternative of the first embodiment of the subject invention.
Figure 6:
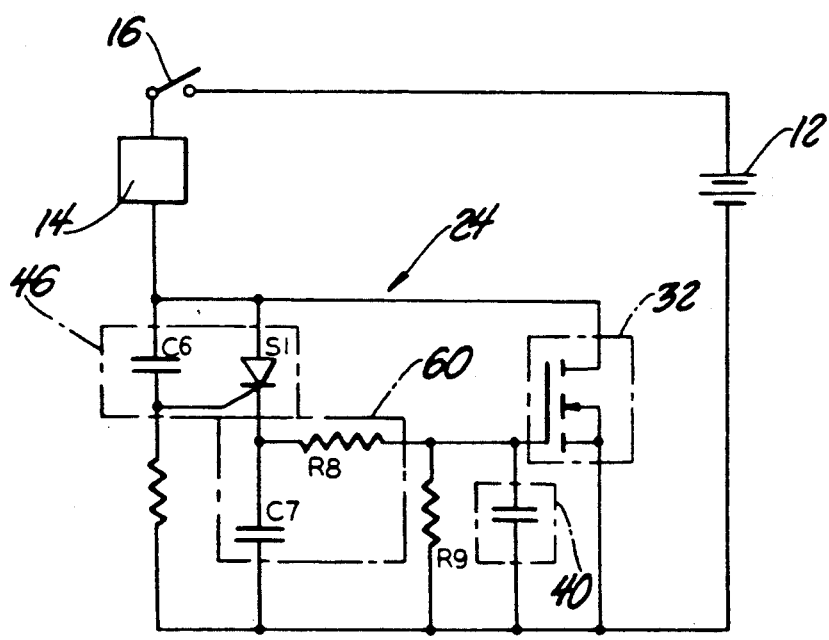
FIG. 6 is a schematic diagram of the second embodiment of the subject invention.

The second alternate circuit implementation of the first embodiment is generally shown in FIG. 5 wherein the timing means 38 includes a storage means 38 connected to the emitter of a transistor Q1 for charging the storage means 38 to the predetermined magnitude and discharging for the predetermined time. The collector of the transistor of the transistor Q1 is connected to the power supply 12. The storage means 38 is comprised of a storage capacitor 38 which is charged by the transistor Q1. The electronic switch means 30 is implemented by four parallel inverters 52, 53, 54, 55 which have sufficient current source and capacity from any battery 12 powered loads 14. The storage capacitor 38 keeps the input to the inverters 52, 53, 54, 55 high for over 30 minutes with the values shown. The output of the inverters 52, 53, 54, 55 goes low whenever the voltage on the storage capacitor 38 falls below one third the voltage power supply or battery 12. An inverter 56 is connected between the emitter of the transistor Q1 and the parallel inverters 52, 53, 54, 55. An input inverter 58 is connected to the base of the transistor Q1 and acts as a high input impedance driver for the transistor Q1, and as a sensing detector of the turn on current pulse. A capacitor C4 is normally charged to battery voltage 12 through resistor R5 and the load 14. When the device switch 16 is closed, the charge stored on the capacitor C4 is discharged through a diode D2 through the electrical device or load 14 producing the turn-on pulse. The attendant negative going pulse is coupled through capacitor C5 to the input of the inverter 58 which is normally held high by an input pull-up resistor R6. The output of the inverter 58 is therefore normally low and the negative input pulse to the inverter 58 momentarily drives the output of the inverter 58 high driving the transistor Q1 into conduction thereby charging the storage capacitor 38 to battery voltage 12. Using a second isolation diode D3 is necessary because the CMOS inverters 52, 53, 54, 55 will also send current when they are off thereby disabling the input of the timing means 38.

The second embodiment includes contacts 101, 102 electrically connecting the assembly in series with the power supply or batteries 12 and electrical device 14. The timing means 40 includes a storage means in the form of a capacitor 40 controlling the electronic switch means 32 for charging to a predetermined magnitude and discharging for the predetermined time. The control means 24 also includes time delay means 60 for delaying the closing of the electronic switch means 32 until the storage capacitor 40 has charged. The two terminal configuration is particularly useful in battery powered devices which use a series of stacked cylindrical cells. A preferred embodiment includes a low profile disk construction as shown in FIG. 2 which allows the device to be easily inserted in series with a battery stack. The switch means 32 is a MOSFET 32 connected in series with the battery 12 and the load 14 for connecting and disconnecting the battery 12 to the load 14 and vise versa. An SCR S1 (silicon controlled rectifier) is connected to the load 14 and is triggered by the closure of the device switch 16 because capacitor C6 is discharged through the electrical device 14 acting as load. Capacitor C6 is connected to the load 14 and resistor R7 to the battery 12. The gate of the SCR S1 is connected between the resistor R7 and capacitor C6. The storage capacitor 40 is charged to the battery 12 voltage by transient conduction of the SCR S1 as long as MOSFET 32 is kept off. The time delay means 60 is comprised of resistor R8 and capacitor C7 which establish a hold off time delay so that the gate of the MOSFET 32 cannot reach its VGS threshold until the storage capacitor 40 is charged. When the MOSFET 32 is driven into conduction, the voltage drop across the timer assembly 100 is essentially zero so that the operating power must be provided by the charged stored in the storage means or capacitor 40. With the values shown in the specific embodiment, a timer period of approximately 30 minutes is realized with a 9 volt battery 12. A resistor R9 is connected in parallel with the storage capacitor 40 to provide a fixed stable discharge path for the capacitor 40 as well as keeping the MOSFET 32 off and nonconducting in the absence of the gate drive voltage. The quiescent current drain of the circuit 22 is on the order of 0.5 uA, which is close to the internal self discharge current for most batteries. This quiesecent drain disappears completely if the device switch 16 is open.

There is also included a method of disconnecting power 12 from an electrical device 14 after a predetermined time. The steps include detecting 42, 44, 46 the closure of the device switch 16, connecting the power supply 12 to the electrical device 14 for a predetermined time while the device switch 16 remains closed, and disconnecting the power supply 12 from the electrical device 14 upon expiration predetermined time. Also included is audibly indicating when the predetermined time is about to expire.

In the first embodiment 10, connectors C1, C2, C3, C4 connect the assembly 10 in parallel with the battery 12. The battery 12 includes a pair of battery connectors 60, 62 which are generally received by or plugged into device connectors 64, 66 to make the requisite power connection. As previously stated, the timer assembly 10 is to be interposed between the battery 12 and electrical device 14, and therefore between the battery connectors 60, 62 and device connectors 64, 66. The battery connectors 60, 62 include a male member 60 and female member 62 to be connected in correct polarity with the device connectors 64, 66. The device connectors 64, 66 include male 66 and female 64 connectors, for connection with the battery connectors 60, 62.

The timer assembly includes a thin rectangular shaped housing 68 substantially the same shape as the top surface of the battery 12 containing the battery connectors 60, 62. The support housing 68 supports the connectors C1, C2, C3, C4, with a pair of connectors C1, C2, and C3, C4 on each face of the thin housing 68. Each pair of connectors C1, C2, C3, C4 include a male C1, C4 and female C2, C3 member for connection in the respective battery connectors 60, 62 and device connectors 64, 66, as indicated in FIG. 1. The housing 68 should be as thin as possible for compaction within the electrical device 14, as commonly known in the marketplace.

In the second embodiment 100, contacts 101, 102 connect the assembly 100 in series with the batteries 12 and the electrical device 14. Generally, this type of electrical device 14 uses a "stack" or several cylindrical battery cells end to end. The contact 101, 102 for the upper and lower surfaces of a thin disk shaped housing 168 with an insulating sleeve 170 about the circumference of the disk housing 168. The upper surface indicated the "positive" polarity stamped on the contact 101 for consumer placement within the battery stack.

The following list of component values have been used in the preferred embodiment. It is to be understood that the values may be varied to change the predetermined time or cycle period, or any other features of the invention.

| RESISTORS | | | |
| --- | --- | --- | --- |
| Reference No. | Value | Reference No. | Value |
| R1 | 5.6M | R6 | 5.6M |
| R2 | 5.6M | R7 | 10M |
| R3 | 10M | R8 | 10M |
| R4 | 4.7K | R9 | 51M |
| R5 | 4.7K | | |

| CAPACITORS | |
| --- | --- |
| Reference No. | Value (Farads) |
| C1 | .001u |
| C2 | .1u |
| C3 | 1u |
| C4 | .01u |
| C5 | .1u |
| C6 | .01u |
| C7 | 50u |
| 38 | 100u |
| 40 | .02u |

| DIODES | |
| --- | --- |
| Reference No. | Type |
| D1, D2, D3 | 1N4148 |

| TRANSISTORS & I.C.'s | |
| --- | --- |
| Reference No. | Type |
| 28, Q1 | 2N4403 |
| 36 | 7242 |
| 52,53,54,55,56,58 | CD404D |
| 32 | 2N7000 |
| S1 | 2N5062 |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A timer assembly (10, 100) to be placed between a power supply (12) and an electrical device (14) supplied power from the power supply (12) with the electrical device (14) having a devices switch (16) to be closed to connect the power supply (12) to the electrical device (14) and to be opened to disconnect the power supply (12) from the electrical device (14), said timer assembly comprising: an electrical device comprising an electrical load and a device switch in series with said load for closing and opening, and having power lines adapted to be connected to the power supply (12) with said device switch controlling powering of said electrical load; control means (18, 20, 22, 24) for placement between said electrical device and the power supply having an input to be connected to the power supply (12) and an output to be connected to said electrical device (14) containing said device switch (16); said control means (18, 20, 22, 24) including electronic switch means (26, 28, 30, 32) for connecting and disconnecting the power supply (12) to said electrical device (14) through said output, and including timing means (34, 36, 38, 40) responsive to the closure of said device switch (16) of said electrical device (14) for closing said electronic switch means (26, 28, 30, 32) until said device switch (16) is opened disconnecting power from said control means (18, 20, 22, 24) time independent of prior opening thereof, and for opening said electronic switch means (26, 28, 30, 32) independently of said device switch (16) after a predetermined time after the closure of said device switch (16) while said device switch (16) remains closed at the expiration of the predetermined time and remains closed upon opening of said electronic switch means (26, 28, 30, 32) and for reinitiating said predetermined time upon subsequent opening and re-closure of said device switch (16) to close said electronic switch means (26, 28, 30, 32).

2. An assembly as set forth in claim 1 further characterized by said control means (18, 20, 22, 24) including detection means (42, 44, 46) for detecting a turn-on current pulse when the device switch (16) is closed initiating said timing means (34, 36, 38, 40).

3. An assembly as set forth in claim 2 further characterized by said control means (18, 20, 22, 24) including time-out indicating means (50) for audibly indicating when said predetermined time is about to expire.

4. An assembly as set forth in claim 2 further characterized by including said power supply (12) comprising batteries.

5. An assembly as set forth in claim 2 further characterized by said control means (20, 22) including connectors (C1-C4) for connecting said assembly (10) in series with the power supply (12) and said electrical device (14).

6. An assembly as set forth in claim 5 further characterized by said detection means (42, 44) including a first capacitor (C1, C4) connected between the power supply (12) and ground for discharging upon closure of the device switch (16) and second capacitor (C2, C5) for producing the turn-on current pulse in response to said first capacitor (C1, C4) discharging.

7. An assembly as set forth in claim 5 further characterized by said electronic switch means (26, 28, 30, 32) comprising a transistor (28) connected between the power supply (12) and said electrical device (14) with its base controlled by said timing means (36).

8. An assembly as set forth in claim 7 further characterized by said timing means (36) comprising a timing integrated circuit chip for controlling said transistor (28) in response to the closure of the device switch (16).

9. An assembly as set forth in claim 5 further characterized by said electronic switch means (30) comprising parallel inverters (52, 53, 54, 55) connected between the power supply (12) and the electrical device (14) controlled by said timing means (38).

10. An assembly as set forth in claim 9 further characterized by said timing means (40) comprising a storage capacitor for charging to a predetermined magnitude and discharging for said predetermined time.

11. An assembly as set forth in claim 2 further characterized by said control means (24) including contacts (101, 102) connecting said assembly (100) in series with the power supply (12) and the electrical device (14).

12. An assembly as set forth in claim 11 further characterized by said timing means (40) including a storage capacitor (40) controlling said electronic switch means (32) for charging to a predetermined magnitude and discharging for said predetermined time.

13. An assembly as set forth in claim 12 further characterized by said control means (24) including time delay means (60) for delaying the closing of said electronic switch means (32) until said storage capacitor (40) has fully charged.

14. An assembly as set forth in claim 13 further characterized by including an SCR (S1), and said detection means (46) including a capacitor (C6) for discharging upon closure of the device switch (16) to control said SCR (S1) for initiating said time delay means (60).

15. An assembly as set forth in claim 14 further characterized by said electronic switch means (32) including a MOSFET connected in series with the power supply (12) and electrical device (14).

16. A method of disconnecting a power supply (12) from an electrical device (14) having a device switch (16) which is closed to supply power to the device (14) and opened to disconnect power from the device (14), the method including the steps of; interconnecting a device having a series device switch therein by power conductors extending therefrom to the power supply, detecting the closure of the device switch (16) on the power conductors time independent of prior opening thereof, connecting the power supply (12) to the electrical device (14) for a predetermined time after the closure until the device switch (14) is opened disconnecting power from the device (14), and disconnecting the power supply (12) from the electrical device (14) upon expiration of the predetermined time while the device switch (16) remains closed at the expiration of the predetermined time and remains closed upon the disconnecting of power wherein subsequent opening and reclosure of the device switch (16) reinitiates the predetermined time.

17. A method as set forth in claim 16 by the detecting including detecting a turn-on current pulse produced when the device switch (16) is closed.

18. A method as set forth in claim 17 further including audibly indicating when the predetermined time is about to expire.

19. A timer assembly (10, 100) to be placed between a battery powered supply (12) and an electrical device (14) supplied power from the battery powered supply (12) with the electrical device (14) having a device switch (16) to be closed to connect the battery powered supply (12) to the electrical device (14) and to be opened to disconnect the battery powered supply (12) from the electrical device (14) and having power terminals extending from the device (14) to be connected with a battery power supply, said assembly comprising: self-contained housing means (68, 168) comprising a thin shaped insulating structure with electrical contacts extending therein for placement between the power terminals of the electrical device (14) containing the device switch (16) and the battery powered supply (12), and including an input for electrical connection to the battery powered supply (12) and an output for electrical connection to the electrical device (14); said housing means (68, 168) including control means (18, 20, 22, 24) for receiving the battery powered supply (12) through said input and connecting the battery powered supply (12) to the electrical device (14) through said output upon closure of the device switch (16) until the device switch (16) is opened disconnecting the battery powered supply (12) from the electrical device (14) after a predetermined time after the closure of the device switch (16) while the device switch (16) remains closed at the expiration of the predetermined time and upon the disconnecting of power so that subsequent opening and re-closure of the device switch (16) reinitiates the predetermined time.

20. An assembly as set forth in claim 19 further characterized by said input and said output including contacts (C1-C4, 101, 102) for electrically connecting said control means (18, 20, 22, 24) with the electrical device (14) and battery powered supply (12).

21. An assembly as set forth in claim 20 further characterized by said housing means (68, 168) being thin and shaped substantially similar to the battery powered supply (12).

22. An assembly as set forth in claim 21 further characterized by said housing means (68) being a thin rectangular shaped member having two faces, said faces including a pair of said contacts (C1, C2, C3, C4).

23. An assembly as set forth in claim 22 further characterized by said pairs of contacts (C1-C4 including a male connector (C1-C4) and female connector (C2, C3) for mating engagement with the battery powered supply (12) and the electrical device (14).

24. An assembly as set forth in claim 23 further characterized by said housing means (168) being a thin disk shaped member having two faces and a circumference with one of said contacts (101, 102) comprising each face.

25. An assembly as set forth in claim 24 further characterized by said housing means (168) including an insulating sleeve (170) about the circumference of said housing means (168).

26. A timer assembly (10, 100) to be placed between a battery powered supply (12) and an electrical device (14) supplied power from the battery powered supply (12) with the electrical device (14) having a device switch (16) to be closed to connect the battery powered supply (12) to the electrical device (14) and to be opened to disconnect the battery powered supply (12) from the electrical device (14) and having power terminals extending therefrom for connection with the battery powered supply (12), said assembly comprising; control means (18, 20, 22, 24) for connecting the battery powered supply (12) to the electrical device (14) upon closure of the device switch (16) time independent of the prior opening thereof and for disconnecting the battery powered supply (12) for the electrical device (14) after a predetermined time after the closure of the device switch (16), electrically insulated housing means (66, 168) for enclosing and housing said control means (18, 20, 22, 24) and for placement between the electrical device (14) containing the device switch (16) and the battery powered supply (12), said housing means (68, 168) including electrically conductive contacts (C1-C4, 101, 102) extending through said insulated housing means for electrically connecting said control means (18, 20, 22, 24) with the power terminals of the electrical device (14) and the battery powered supply (12).

27. A timer assembly (10, 100) to be placed between a power supply (12) and an electrical device (14) supplied power from the power supply (12) with the electrical device (14) having a device switch (16) to be closed to connect the power supply (12) to the electrical device (14) and to be opened to disconnect the power supply (12) from the electrical device (14) and having power terminals extending therefrom for connection with the power supply (12), said assembly comprising; control means (18, 20, 22, 24) for connecting the power supply (12) to the electrical device (14) upon closure of the device switch (16) and for automatically disconnecting the power supply (12) for the electrical device (14) after a predetermined time after the closure of the device switch (16), electrically insulated housing means (68, 168) for enclosing and housing said control means (18, 20, 22, 24) and for placement between the electrical device (14) containing the device switch (16) and the power supply (12), said housing means (68, 168) including electrically conductive contacts (C1–C4, 101, 102) extending through said insulated housing means for electrically connecting said control means (18, 20, 22, 24) with the power terminals of the electrical device (14) and the power supply (12).

28. A timer assembly as set forth in claim 27 further characterized by said housing means including at most two contacts for connecting to the battery powered supply.

29. A timer assembly as set forth in claim 28 further characterized by including at most two contacts for connecting to the electrical device.

30. A timer assembly as set forth in claim 1 further characterized by said electrical device including at most two power lines extending therefrom for connection to said control means.

31. A timer assembly (10, 100) to be placed between a power supply (12) and an electrical device (14) supplied power from the power supply (12) with the electrical device (14) having a devices switch (16) to be closed to connect the power supply (12) to the electrical device (14) and to be opened to disconnect the power supply (12) from the electrical device (14), said timer assembly comprising: control means (18, 20, 22, 24) for placement between the electrical device and the power supply having at most two input conductors extending therefrom to be connected directly to the power supply (12) and at most two output conductors extending therefrom to be directly connected to the electrical device (14) containing the device switch (16) for interconnecting the electrical device to the power supply while preventing all other electrical connection therewith; said control means (18, 20, 22, 24) including electronic switch means (26, 28, 30, 32) for connecting and disconnecting the power supply (12) to the electrical device (14) through said output, and including timing means (34, 36, 38, 40) responsive to the closure of the device switch (16) of the electrical device (14) for closing said electronic switch means (26, 28, 30, 32) until the device switch (16) is opened disconnecting power from said control means (18, 20, 22, 24) time independent of prior opening thereof, and for opening said electronic switch means (26, 28, 30, 32) independently of the device switch (16) after a predetermined time after the closure of the device switch (16) while the device switch (16) remains closed at the expiration of the predetermined time and remains closed upon opening of the electronic switch means (26, 28, 30, 32) and for reinitiating said predetermined time upon subsequent opening and re-closure of the device switch (16) to close said electronic switch means (26, 28, 30, 32).

* * * * *